(12) United States Patent
Gearty et al.

(10) Patent No.: US 6,477,638 B1
(45) Date of Patent: Nov. 5, 2002

(54) SYNCHRONIZED INSTRUCTION ADVANCEMENT THROUGH CPU AND FPU PIPELINES

(75) Inventors: Margaret Rose Gearty, Bath (GB); Chih-Jui Peng, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,637

(22) Filed: Oct. 1, 1999

(51) Int. Cl.$^7$ .............................................. G06F 15/163
(52) U.S. Cl. ......................... 712/220; 712/203; 712/222
(58) Field of Search ................. 712/222, 203, 712/220

(56) References Cited

U.S. PATENT DOCUMENTS

| | | | | |
|---|---|---|---|---|
| 5,386,585 A | * | 1/1995 | Traylor .......................... | 712/29 |
| 5,428,756 A | * | 6/1995 | Edamatsu et al. ........... | 712/220 |
| 5,774,704 A | * | 6/1998 | Williams ...................... | 713/501 |
| 5,860,000 A | * | 1/1999 | Biswas et al. ............... | 712/244 |
| 6,012,139 A | * | 1/2000 | Biswas et al. ............... | 712/222 |
| 6,044,456 A | * | 3/2000 | Murty et al. ................. | 712/219 |
| 6,253,312 B1 | * | 6/2001 | Elliott et al. ................. | 712/222 |

FOREIGN PATENT DOCUMENTS

| | | | | |
|---|---|---|---|---|
| JP | 409212359 A | * | 8/1997 | |
| JP | 2001147805 A | * | 5/2001 | |

* cited by examiner

*Primary Examiner*—Eddie Chan
*Assistant Examiner*—Stephanie Deckter
(74) *Attorney, Agent, or Firm*—Townsend and Townsend and Crew LLP (57) ABSTRACT

A computer system having a central processing unit (CPU) execution pipeline and a floating point unit (FPU) execution pipeline, the CPU pipeline including a plurality of pipestages and the FPU pipeline including a plurality of pipestages, wherein each CPU pipestage in the CPU pipeline has a corresponding pipestage in the FPU pipeline, a method of synchronizing operation of the CPU pipeline and the FPU pipeline, the method including the steps of (a) receiving an instruction in a first CPU pipestage, (b) receiving the instruction in a corresponding first FPU pipestage, (c) processing the instruction in the first CPU pipestage, (d) processing the instruction in the first FPU pipestage, (e) generating, by the first CPU pipestage, a first signal indicating that the instruction has been processed by first CPU pipestage and is ready to proceed to a second pipestage in the CPU pipeline, (f) generating by the first FPU pipestage, a second signal indicating that the instruction has been processed by the first FPU pipestage and is ready to proceed to a second pipestage in the FPU pipeline, (g) sending the instruction from the first CPU pipestage to the second pipestage in the CPU pipeline, (h) sending the instruction from the first FPU pipestage to the second pipestage in the FPU pipeline, (i) wherein the second pipestage in the CPU pipeline responds to the second signal to send the instruction to a third pipestage in the CPU pipeline, and (j) wherein the second pipestage in the FPU pipeline responds to the first signal to send the instruction to a third pipestage in the FPU pipeline. A corresponding apparatus is also provided.

9 Claims, 6 Drawing Sheets

SYNCHRONIZED INSTRUCTION ADVANCEMENT THROUGH CPU AND FPU PIPELINES

BACKGROUND OF THE INVENTION

1. Field of the Invention

The present invention relates generally to microcomputers. More particularly, the present invention relates to a single chip microcomputer having a central processing execution unit and a floating point execution unit.

2. Discussion of the Related Art

System-on-chip devices (SOCs) generally microcomputers, are well-known. These devices generally include a processor (CPU), one or more modules, bus interfaces, memory devices, and one or more system busses for communicating information. One module that may be incorporated into a microcomputer is a floating point coprocessor, typically referred to as a floating point unit or FPU. A floating point unit is used to execute instructions that involve non-integer numbers. Typically, non-integer numbers are represented as a computer word divided into two parts, an exponent and a significant. Floating point units are special purpose processors designed specifically to execute arithmetic operations involving these non-integer representations of numbers.

Microcomputers with fully integrated or embedded floating point units are known. When the floating point unit is embedded in, or tightly integrated with the CPU of the microcomputer, the FPU and CPU typically share a number of operational blocks. Therefore, the interface between the FPU and CPU, both in hardware and software, is very tightly integrated. Although this level of integration typically provides high performance, such as high throughput, it can be difficult to design and build versions of the microcomputer without the FPU for sale to customers who do not want or do not require the functions of the FPU. Removing the FPU from the microcomputer can be quite difficult as a number of aspects of the microcomputer design have to be changed and in some cases removing the FPU from the microcomputer can involve a significant redesign effort.

Separate microcomputer and floating point processor systems are also known. In these systems, the microcomputer and floating point unit are typically separate integrated circuit chips and an interface is provided for the exchange of instructions and data between the CPU and the FPU. One form of interface between the CPU and the FPU uses a buffering arrangement. In these types of arrangements, the timing and synchronization requirements for execution of instructions in the CPU and FPU can be relaxed, resulting in relatively "loose" coupling between the processors. This type of system has advantages in that it is straightforward to offer the FPU as an option to the microcomputer. However, because the coupling between the CPU and FPU is loose, performance, such as throughput, may suffer because operation of the CPU and FPU is not tightly synchronized.

SUMMARY OF THE INVENTION

According to one aspect of the invention, there is provided computer system, including a single chip microcomputer including a central processing unit (CPU), a memory unit coupled to the CPU, an interface adapted to couple the CPU to a floating point instruction processing unit (FPU), an FPU present signal coupled from the interface to the CPU, floating point present signal having a first state that indicates to the CPU that an FPU is present in the single chip microcomputer and a second state that indicates to the CPU that an FPU is not present in the single chip microcomputer, where the single chip microcomputer responds to the first state of the FPU present signal to send floating point instructions across the interface to the FPU and to the second state of the signal to trap floating point instructions.

According to another aspect of the invention, the single chip microcomputer raises an exception when the FPU present signal is in the second state and a floating point instruction is trapped. According to another aspect of the invention, the computer system, comprises a single chip microcomputer, including a central processing unit, a memory unit coupled to the CPU, an interface adapted to couple the CPU to a floating point instruction processing unit (FPU), means for indicating to the CPU that an FPU is present in the single chip microcomputer, and means, responsive to the means for indicating, for controlling the single chip microcomputer in response to the means for indicating.

According to another aspect of the invention, the computer system includes means for indicating comprises an FPU present signal having a first state that indicates that an FPU is present in the single chip microcomputer and a second state that indicates that an FPU is not present in the single chip microcomputer.

According to another aspect of the invention, the computer system includes means for controlling sends floating point instructions to the FPU when the FPU present signal is in the first state and traps floating point instructions when the FPU present signal is in the second state.

According to another aspect of the invention, the computer system comprises a single chip microcomputer including a central processing unit (CPU), a memory unit coupled to the central processing unit, an interface adapted to couple the CPU to a floating point instruction processing unit (FPU), a method of determining if an FPU is present in the computer system, the method comprises the steps of using the FPU to send an FPU present signal across the interface to the CPU where the FPU present signal has a first state indicating to the CPU that an FPU is present in the single chip microcomputer and a second state indicating to the CPU that an FPU is not present in the single chip microcomputer; and using the CPU to respond to the FPU present signal so that the single chip microcomputer sends floating point instructions across the interface to the FPU in response to the first state of the FPU present signal and traps floating point instructions in response to the second state of the FPU present signal. According to another aspect of the invention, the computer system includes a central processing unit (CPU) execution pipeline and a floating point unit (FPU) execution pipeline, the CPU execution pipeline including a CPU decoder pipestage and the FPU execution pipeline including an FPU decoder pipestage, the method comprises the steps of a) sending a first instruction to the CPU decoder pipestage, b) sending the first instruction to the FPU decoder pipestage, c) generating a signal indicating that the first instruction has been accepted by the CPU decoder pipestage, d) generating a signal indicating that the first instruction has been accepted by the FPU decoder pipestage, e) sending a second instruction to the CPU decoder pipestage in response to step d, and f) sending a second instruction to the FPU decoder pipestage in response to step c.

According to another aspect of the invention, the computer system further comprises the step of resending the first instruction to the CPU decoder pipestage until the signal in step d is generated.

According to another aspect of the invention, the computer further comprises the step of resending the first instruction to the FPU decoder pipestage until the signal in step c is generated According to another aspect of the invention, the computer system includes a central processing unit (CPU) execution pipeline and a floating point unit (FPU) execution pipeline, the CPU pipeline including a plurality of pipestages and the FPU pipeline including a plurality of pipestages, where each CPU pipestage in the CPU pipeline has a corresponding pipestage in the FPU pipeline, a Method of synchronizing operation of the CPU pipeline and the FPU pipeline, the method comprises the steps of, a) receiving an instruction in a first CPU pipestage, b) receiving the instruction in a corresponding first FPU pipestage, c) processing the instruction in the first CPU pipestage, d) processing the instruction in the first FPU pipestage, e) generating, by the first CPU pipestage, a first signal indicating that the instruction has been processed by first CPU pipestage and is ready to proceed to a second pipestage in the CPU pipeline, f) generating by the first FPU pipestage, a second signal indicating that the instruction has been processed by the first FPU pipestage and is ready to proceed to a second pipestage in the FPU pipeline, g) sending the instruction from the first CPU pipestage to the second pipestage in the CPU pipeline, h) sending the instruction from the first FPU pipestage to the second pipestage in the FPU pipeline, I) where the second pipestage in the CPU pipeline responds to the second signal to send the instruction to a third pipestage in the CPU pipeline, and j) where the second pipestage in the FPU pipeline responds to the first signal to send the instruction to a third pipestage in the FPU pipeline.

According to another aspect of the invention, there is provided a method where the second pipestage in the CPU pipeline further responds to the second signal to prevent the second pipestage in the CPU pipeline from sending instructions to the third pipestage in the CPU pipeline until another second signal is received from the first FPU pipestage.

According to another aspect of the invention, there is provided a method where the FPU pipeline further responds to the first signal to prevent the second pipestage in the FPU pipeline from sending instructions to the third pipestage in the FPU pipeline until another first signal is received from the first CPU pipestage.

According to another aspect of the invention, the computer comprises a central processing unit (CPU) execution pipeline including a plurality of pipestages, a floating point unit (FPU) execution pipeline including a plurality of pipestages, where each CPU pipestage in the CPU pipeline has a corresponding pipestage in the FPU pipeline, first means for controlling transmission of instructions from a first CPU pipestage to a second CPU pipestage in response to a control signal provided by an FPU pipestage, and second means for controlling transmission of instructions from a first FPU pipestage to a second FPU pipestage in response to a control signal provided by a CPU pipestage.

According to another aspect of the invention, the first means for controlling is a token signal having a first state that enables transmission of instructions and a second state that disables transmission of instructions.

According to another aspect of the invention, the first CPU pipestage responds to the first state of the token signal to transmit an instruction.

According to another aspect of the invention, the first CPU pipestage generates a signal that cancels the token signal when an instruction is transmitted.

According to another aspect of the invention, the first FPU pipestage responds to the first state of the token signal to transmit an instruction.

According to another aspect of the invention, the first FPU pipestage generates a signal that cancels the token signal when an instruction is transmitted.

According to another aspect of the invention, the computer includes a central processing unit (CPU) execution pipeline and a floating point unit (FPU) execution pipeline, the CPU pipeline including a plurality of pipestages and the FPU pipeline including a plurality of pipestages where each CPU pipestage has a corresponding pipestage in the FPU pipeline, a method of synchronizing operation of the CPU pipeline and the FPU pipeline, the method comprises the steps of a) providing instructions to each pipestage in the CPU pipeline, b) providing the instructions to each corresponding pipestage in the FPU pipeline, c) executing the instructions in the CPU pipeline, d) executing the instructions in the FPU pipeline, e) stalling the CPU pipeline in response to a stall condition, f) stalling the FPU unit pipeline a predetermined number of pipestages after the CPU pipeline has stalled, g) storing the state of execution of the floating point processing unit pipeline in response to step f, h) removing the stall condition and restarting the CPU pipeline, I) presenting the data stored in step g to the CPU pipeline when it restarts, j) restarting the FPU pipeline at the predetermined number of pipestages after the CPU pipeline is restarted.

According to another aspect of the invention, there is provided a method where step (g) further comprises storing execution results of each pipestage in the FPU pipeline.

According to another aspect of the invention, there is provided a method where the predetermined number of pipestages comprises one pipestage.

BRIEF DESCRIPTION OF THE DRAWINGS

In the drawings, which are incorporated herein by reference and in which like elements have been given like reference characters.

DETAILED DESCRIPTION

Figure 1:
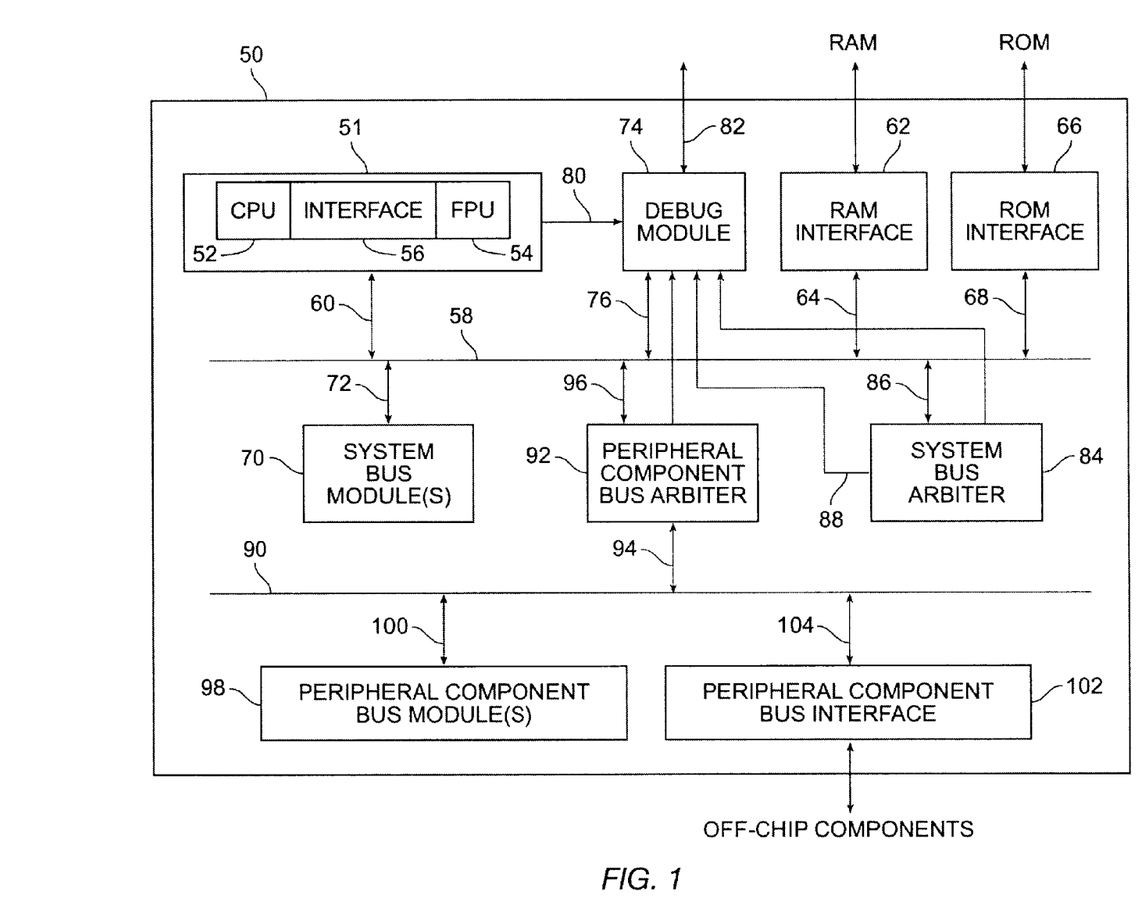
FIG. 1 is a microcomputer according to the invention including an optional floating point processor (FPU)

FIG. 1 illustrates a single chip microcomputer 50 according to the invention. Microcomputer 50 includes a central processing unit core 51 for executing operations within the computer. An integer central processing unit (CPU) 52 and an optional floating point processor unit (FPU) 54 are provided as part of the CPU core 51. An interface 56, which will be explained in more detail hereinafter, provides the mechanism for exchanging data, instructions, and control signals between integer CPU 52 and FPU 54. CPU core 51 also includes other modules such as, for example, an instruction fetch unit and a load store unit. In this description, CPU 52 refers to the portion of CPU core 51 that executes integer operations. CPU core 51 is coupled to a system bus 58 via a data link 60. System bus 58 provides a pathway for the exchange of data, instructions, and control signals among the modules and interfaces attached to the system bus.

A RAM interface 62 that provides an interface to off-chip random access memory is coupled to system bus 58 via data link 64. A ROM interface 66 that provides access to off-chip read only memory is coupled to system bus 58 via data link 68. Other system bus modules 70 are coupled to system bus 58 by data link 72.

A debug module 74 containing a debug interface is coupled to system bus 58 via data link 76. Debug module 74 receives debugging data from CPU core 51 via data link 80. Debug module 74 provides an off-chip interface via debug link 82 that allows microcomputer 50 to interface to external equipment or software.

Microcomputer 50 also includes a system bus arbiter 84 coupled to system bus 58 via data link 86. System bus arbiter 84 controls the flow of data traffic over system bus 58. System bus arbiter 84 sends debugging information, such as the triggering of system bus watchpoints via data link 88 to debug module 74.

Microcomputer 50 also includes a peripheral component bus 90. A peripheral component bus arbiter 92 controls the data flow over the peripheral component bus 90, is coupled to peripheral component bus 90 via data link 94, and provides an interface to system bus 58 via data link 96.

Peripheral component bus modules 98 can be coupled to peripheral component bus 90 via data link 100. A peripheral component bus interface 102, coupled to peripheral component bus 90 via data link 104 provides an interface for off-chip components to peripheral component bus 90.

Figure 2:
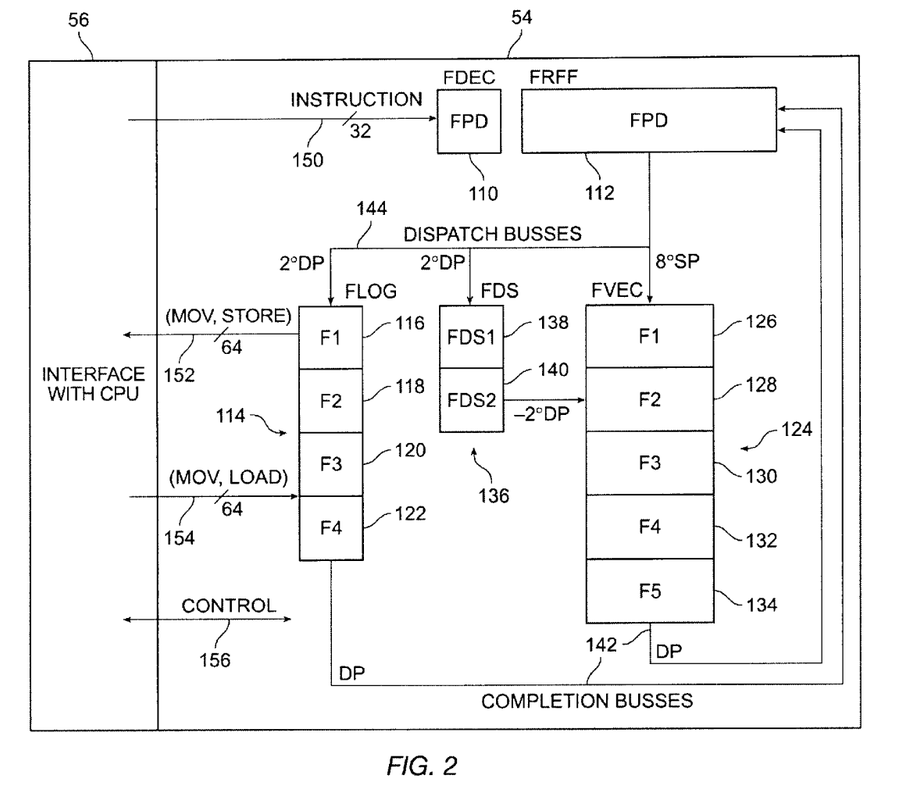
FIG. 2 is a block diagram illustrating a floating point unit and the interface between the FPU and the CPU that may be used in the microcomputer of FIG. 1.

FIG. 2 is a more detailed block diagram of FPU 54 and interface 56 illustrated in FIG. 1. FPU 54 includes a number of functional modules. Module 110 is a floating point unit decoder and pipe control block that decodes 32 bit instructions from CPU 52 sent via interface 56. Module 112 is a floating point unit register file and forwarding network. Module 114, comprising execution pipestages F1, F2, F3 and F4 respectively numbered as 116, 118, 120 and 122 is a floating point logical execution module for executing coexecuted CPU instructions and for controlling register access. Module 124 comprising execution pipestages F1, F2, F3, F4, F5 respectively numbered as 126, 128, 130, 132 and 134 is a floating point vector and basic compute unit for executing compute, blocking computer, vector compute, blocking vector compute, type conversion, and polynomial compute operations. Module 136, comprising execution pipestages FDS 1 and FDS2 respectively numbered as 138 and 140 is a floating point divide and square root executing unit for executing non-blocking compute operations such as divide and square root operations. Completion busses 142 and dispatch busses 144 couple modules 114, 124, and 136 to module 112.

One skilled in the art will appreciate that in the following explanation, clock signals necessary to the operation of the illustrated logic have not been shown to simplify the drawings. However, one of skill in the art would know where and when to apply appropriate clock signals to achieve the desired functions.

A feature of the invention is that the FPU 54 is designed to be a self-contained, detachable portion of the CPU core 51. Therefore, data movement between CPU 52 and FPU 54 via interface 56 is limited to 32 bit instructions 150 and two 64 bit busses 152 and 154 for transporting data. A control signal interface 156 is also provided for controlling and synchronizing execution of instructions between CPU 52 and FPU 54.

Figure 3:
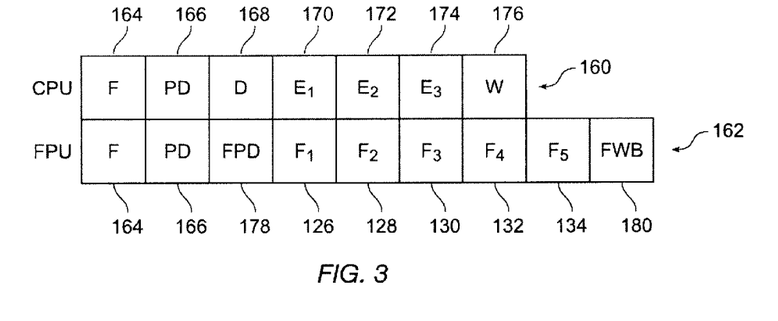
FIG. 3 is a diagram illustrating the CPU execution pipeline and the FPU execution pipeline and the relationship between the pipe stages in each pipeline of the microcomputer of FIG. 1.

FIG. 3 illustrates the structures of the execution pipelines and the relationship between the various pipestages of the execution pipelines in CPU 52 and FPU 54. CPU 52 includes an execution pipeline 160. FPU 54 includes an execution pipeline 162. Each pipeline 160 and 162 include a number of pipestages. CPU 52 and FPU 54 share the instruction fetch pipestage 164 and the predecode pipestage 166. CPU pipeline 160 includes a decode pipestage 168, three execution pipestages 170, 172 and 174, and a writeback pipestage 176. FPU pipeline 162 includes a floating point decode pipestage 178, five execution pipestages 126, 128, 130, 132 and 134, and a floating point writeback stage 180 that sends the results of the floating point unit execution pipeline 162 to module 112 for transmission back to CPU 52.

During operation, instructions are sent simultaneously to both the CPU pipeline 160 and the FPU pipeline 162 for execution. There are two types of instructions executed by CPU pipeline 160 and FPU pipeline 162. A first category of instructions is a pure CPU instruction that executes totally in CPU pipeline 160 and does not require any contribution for completion from FPU pipeline 162. As will be explained in more detail hereinafter, CPU pipeline 160 and FPU pipeline 162 are closely coupled and, therefore, when a pure CPU instruction is executing in CPU pipeline 160 an instruction image is executing in FPU pipeline 162. In the case of a pure CPU instruction executing in CPU pipeline 160, the image of that instruction in FPU pipeline 162 is a bubble.

A second category of instructions that executes in CPU pipeline 160 and FPU pipeline 162 is FPU instructions. All FPU instructions are in this group. Every FPU instruction must execute to some degree in CPU pipeline 160 as an instruction image, if only to gather exception details and completion status. A first subgroup of FPU instructions are joint CPU-FPU instructions with data exchange. These instructions involve data exchange between CPU pipeline 160 and FPU pipeline 162, either from the FPU to the CPU or from the CPU to the FPU. A second subgroup of FPU instructions are joint CPU-FPU instructions without data exchange. These instructions execute entirely within the FPU pipeline and CPU pipeline 160 is only involved with these instructions to gather exception information and completion status. When a joint CPU-FPU instruction without data exchange between FPU pipeline 162 and CPU pipeline 160 is executing in FPU pipeline 162, a floating point placeholder executes through the CPU pipeline 160 as the instruction image gathering exception details and keeping the pipelines synchronized. When the joint CPU-FPU instruction with data exchange is executing in FPU pipeline 162, the FPU instruction is also executing in CPU pipeline 160 as the instruction image so the pipelines remain synchronized.

A feature of the invention is to maintain a close coupling and synchronization of execution between FPU pipeline 162 and CPU pipeline 160. Maintaining a close coupling and synchronization between the two pipelines has several advantages. A significant advantage is that maintaining close synchronization between FPU pipeline 162 and CPU pipeline 160 allows microcomputer 50 to maintain a precise exception model. A precise exception model means that instructions must execute and finish in order so that-when an exception is generated due to some hardware or software problem in microcomputer 50, the state of execution of microcomputer 50 will be clear at the time the error each signal with respect to whether the signal is input to the FPU or output from the FPU. Column "Src" indicates which unit, as between the CPG, (clock generator circuit), the FPU, the instruction fetch unit (IFU) the load/store unit (LSU) is the source of the signal. Column "Size" indicates the number of bits in the signal. Column "Stage Sent" indicates which stage in CPU 52 or FPU 54 sends the signal. Column "Latch by" indicates whether the signal is latched on the CPU side of interface 56 or on the FPU side of interface 56. Column "Description" provides a description of each signal.

| Name | Dir | Src | Size | Stage Sent | Latched by | Description |
|---|---|---|---|---|---|---|
| cpg_fpu_clk_en | in | CPG | 1 | | | Clock stop for the FPU |
| fpu_present | out | FPU | 1 | | CPU | Indicates if FPU is present or not |
| ifu_sr_fd | in | IFU | 1 | W | CPU | The SR Floating-point Disable bit. |
| ifu_fpu_inst_pd | in | IFU | 28 | PD | FPU | Opcode (sent in pre-decode stage) |
| ifu_fpu_inst_valid_pd | in | IFU | 1 | PD | FPU | Opcode is valid (in pre-decode stage) usable in FPD |
| ifu_fpu_pred_inst_pd | in | IFU | 1 | PD | FPU | The instruction being sent is on a branch prediction path. |
| ifu_fp_go_dec | in | IFU | 1 | D | FPU | The valid FP instruction in the IFU decode stage can proceed (no stalling) |
| ifu_fpu_mispred_e2 | in | IFU | 1 | E2 | CPU | A mispredicted cond branch is resolved in the CPU pipe. |
| ifu_fpu_cancel_wb | in | IFU | 1 | W | CPU | An FPU/CPU instruction in WB has an associated CPU exception and the pipeline must be canceled (from F4 back to FPD). |
| lsu_stall_e3 | in | LSU | 1 | E3 | FPU | E3 stage back is stalled in CPU (only usable in F4) |
| ifu_fpu_data_wb[63:0] | in | IFU | 64 | W | CPU | Data from Integer CPU for FLD, FMOV (usable in F4) |
| fpu_fp_go_dec | out | FPU | 1 | FPD | CPU | The valid FP instruction in the FPU decode stage can proceed |
| fpu_dec_stall | out | FPU | 1 | FPD | CPU | FPU decode buffer has a valid FP instruction and FPD is stalled internally, and therefore can not accept a new instruction from CPU. |
| fpu_ifu_excep_f2 | out | FPU | 1 | F2 | CPU | FPU exception has occurred |
| fpu_lsu_data_f1[63:0] | out | FPU | 64 | F1 | CPU | Data to Integer CPU (usable in E2) |
| fpu_lsu_fcmp_f2 | out | FPU | 1 | F2 | CPU | FCMP result (used in E3) | occurred. This allows the state of various components at the time the exception occurred to be examined and corrective action taken. If a precise exception model is not maintained, then when an error occurs it can become difficult to determine the state that various components of the microcomputer were in at the time the error occurred, which can make tracing and correction of the problem very difficult.

Another feature of the invention is that FPU 54 can be optional. As will be explained in more detail hereinafter, the interface 56 between FPU 54 and CPU 52 is designed so that deleting FPU from the particular version of microcomputer 50 does not require significant redesign of the microcomputer. FPU 54 can simply be completely deleted from the single integrated circuit containing microcomputer 50 without redesigning the circuitry or modifying the software.

Thus, interface 56 allows FPU 54 to be an option in microcomputer 50 but also provides a higher level of throughput performance then separate microcomputers and coprocessors would, while at the same time allowing microcomputer 50 to maintain a precise exception model of operation.

Figure 4:
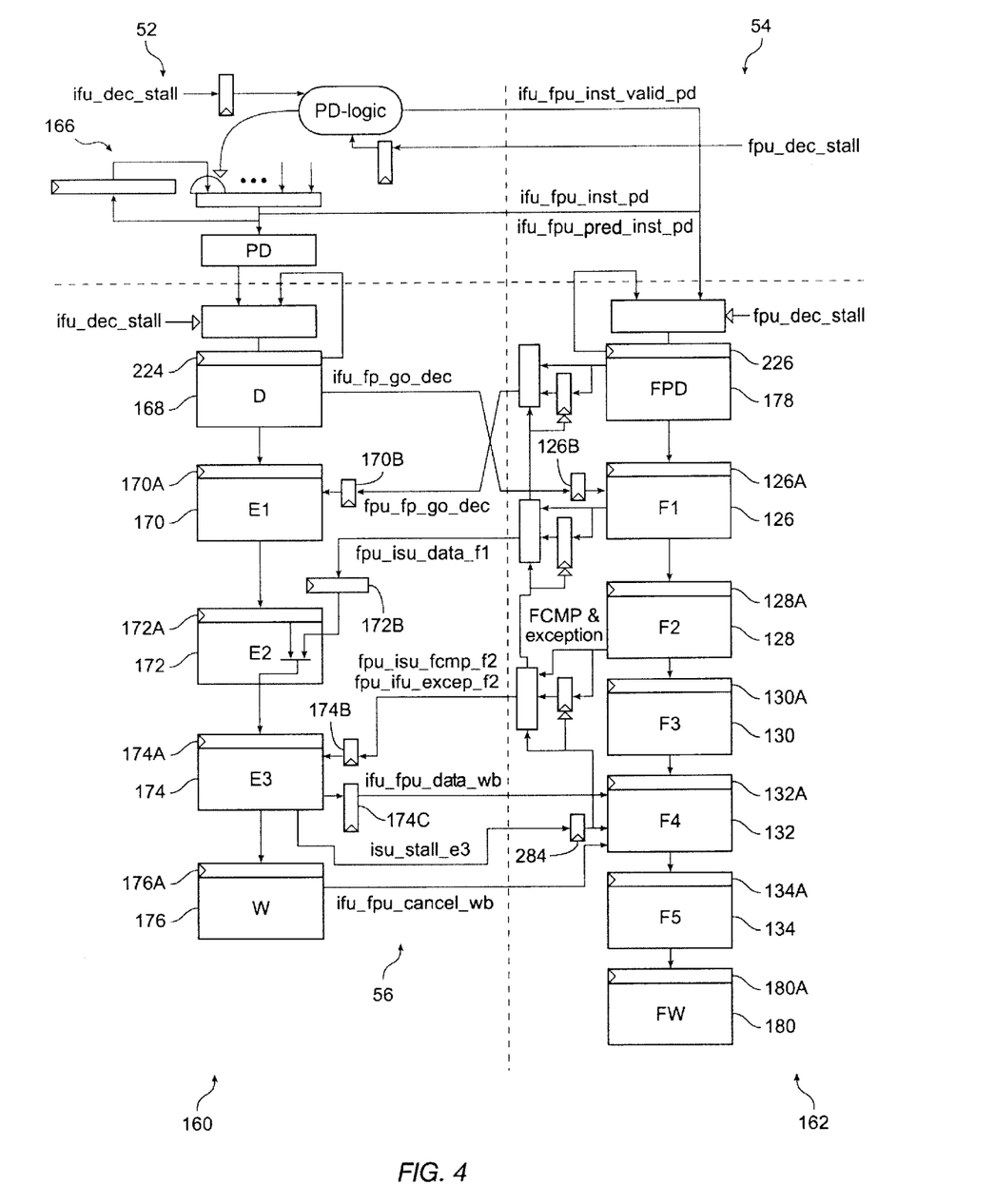
FIG. 4 is a logical block diagram of the interface between the CPU and the FPU in the microcomputer of FIG. 1 illustrating the circuitry and signals used to synchronize the two pipelines.

FIG. 4 is a more detailed block diagram illustrating the interface 56 between CPU 52 and FPU 54. Table 1 below sets forth the set of signals used for communication between CPU 52 and FPU 54. Column "Name" provides a name of each control signal. Column "Dir" indicates the direction of As noted, signals passing between FPU 54 and CPU 52 are latched. Column "Latched by" indicates on which side of the interface the latching circuitry is located. Latching circuitry is necessary because of the time of flight between CPU 52 and FPU 54.

The signal fpu_present indicates to the CPU whether an FPU is present or not. If an FPU is present, this signal will be asserted and the CPU will recognize that the FPU is available. Under these circumstances, the CPU will send instructions to the FPU. If the signal fpu_present is de-asserted, the CPU will recognize that there is no FPU. Under these circumstances, if an FPU instruction is encountered, the CPU will trap on the instructions and raise an exception. Thus, the only signal that changes depending on the presence or absence of an FPU is the fpu_present signal.

The floating point disable signal ifu_sr_fd is provided to disable FPU 54. When this flag is set in the status register (SR) of the CPU, FPU 54 is disabled and all floating point instructions are trapped.

Reference is now made to FIG. 4, which illustrates the circuitry and signals to synchronize CPU pipeline 160 and FPU pipeline 162. CPU pipeline 160 and FPU pipeline 162 normally execute instructions in lockstep, with execution of an instruction proceeding through a respective pair of CPU and FPU pipe stages, for example, 126, 170 or 128, 172, simultaneously. As will be explained in greater detail hereinafter, there are three points in the pipelines where they can slip out of the synchronization and need to be resynchronized before execution can continue. However, the maximum slippage between the pipelines is limited to one instruction or one pipestage in the illustrated embodiment. However, since the FPU pipeline 162 and the CPU pipeline 160 are limited in the amount of slippage that is allowed before the pipelines are stalled and because the pipelines are resynchronized to each other when the stall condition is removed, the precise exception model can be maintained. The points in the pipelines where synchronization can be lost occur in the predecode stage 166, the decoder/E1–F1 pipestages, and the E3/F4 pipestages. Each of these synchronization mechanisms is discussed below.

Each pipestage 168, 170, 172, 174, 176 in CPU pipeline 160 has a respective buffer 224, 170A, 172A, 174A and 176A for storing computational results from a prior pipestage. Each pipestage 178, 126, 128, 130, 132, 134, 180 in FPU pipeline 162 has a respective buffer 226, 126A, 128A, 130A, 132A, 134A, 180A for storing computational results from a prior pipestage.

Due to the time that it takes signals to travel across interface 56 between CPU pipeline 160 and FPU pipeline 162 (time of flight), and because some signals may arrive later in a clock cycle, latches are provided on the CPU side for signals arriving from the FPU and on the FPU side for signals arriving from the CPU. The CPU side includes latches 170B, 172B, 174B and 174C. The FPU side includes latches 126B and 284.

The embodiment illustrated in FIGS. 4–7 allows the CPU and FPU pipelines to be up to one pipestage out of synchronization with each other. However, the invention is not limited to a one pipestage slip but could be any predetermined number of pipestages (or even a zero pipestage slip). That is, the pipelines could be allowed to be out of synchronization by a predetermined number of clock cycles before the pipelines are stalled, as long as the data and state of execution of each pipeline is stored so that when the pipelines are restarted, the data from any pipestage in one pipeline is made available to the other pipeline with the proper timing so that the pipelines can be resynchronized to their same relationship prior to stalling without any loss of data. Allowing the CPU and FPU pipelines to be out of synchronization by a predetermined number of clock cycles also compensates for the time of flight between the CPU pipeline and the FPU pipeline across interface 56.

Figure 5:
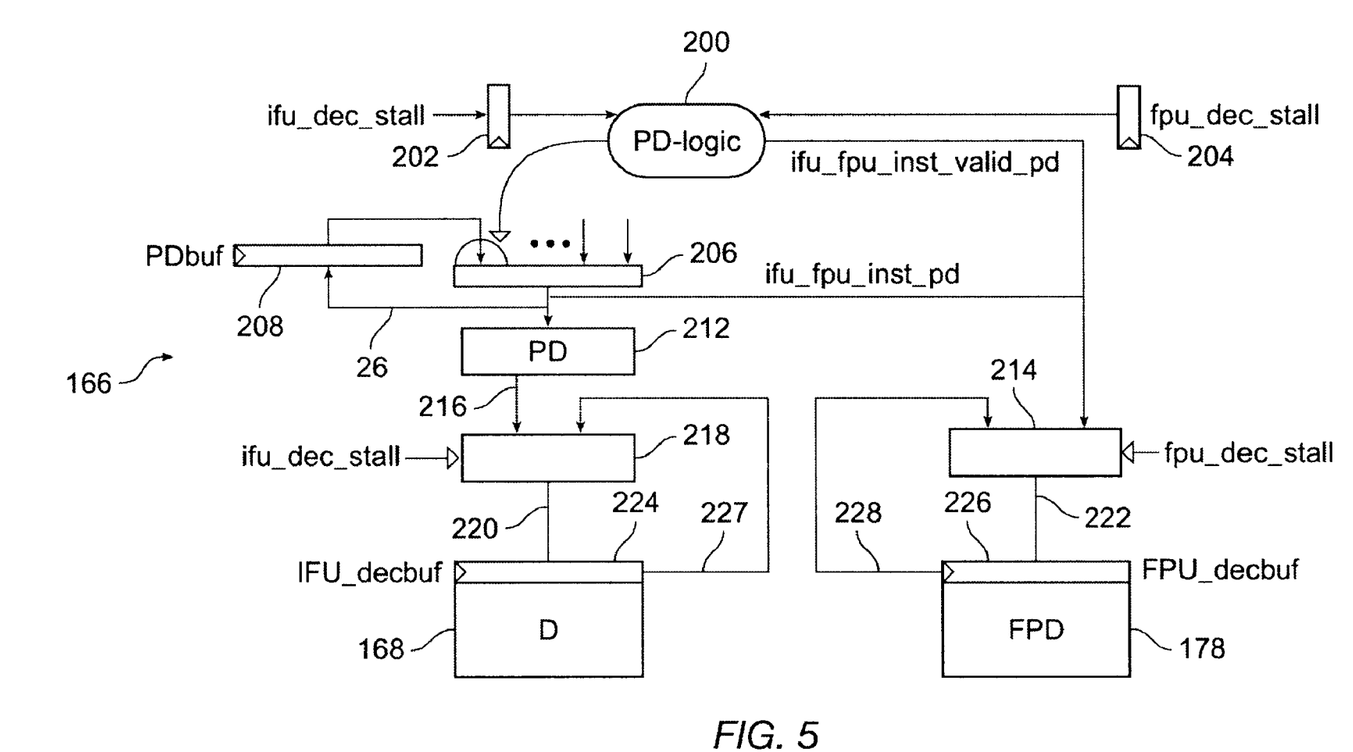
FIG. 5 is a more detailed logical block diagram of the CPU predecoder stage instruction buffering mechanism of FIG. 4.

Reference is now made to FIG. 5, which figure illustrates operation of the CPU predecoder stage instruction buffering mechanism. This section of the circuitry includes a predecode logic circuit 200 that receives an instruction fetch unit decoder stall signal from the CPU instruction fetch unit via latch 202. Predecoder logic 200 also receives a floating point unit decoder stall signal from the floating point unit decoder 178 via latch 204. Fpu_dec_stall is a signal generated whenever floating point unit decoder 178 can not receive and latch the next instruction being sent out by the shared predecode stage. Ifu_dec_stall is a signal generated whenever the instruction fetch unit of CPU 52 is stalled for any reason.

A multiplexer 206 has a number of inputs coupled to predecode buffer 208. Connection 26 allows the output of multiplexer 206 to be sent to predecode buffer 208, predecoder 212 or multiplexer 214. The output of predecoder 212 is sent, via connection 216 to multiplexer 218. Multiplexers 214 and 218 have respective outputs 220, 222 which are respectively coupled to instruction fetch unit decode buffer 224 and FPU decode buffer 226. Buffers 224 and 226 serve to hold instructions being decoded by the decoders 168 and 178. Buffer 224 has an output 227 that allows the instruction in buffer 224 to be recirculated back to multiplexer 218. In a like manner, buffer 226 has an output 228 that allows the current instruction in buffer 226 to be recirculated back to multiplexer 214. If the signal ifu_dec_stall is asserted for any reason, multiplexer 218 will keep selecting and recirculating the instruction until the stall condition is removed. In a like manner, if the fpu_dec_stall signal is asserted, multiplexer 214 will keep recirculating instruction 228 into buffer 226 until the stall condition is removed.

As mentioned previously, instructions from the CPU instruction fetch unit are sent to both CPU pipeline 160 and FPU pipeline 162 for execution. The logic sends the predecode stage instruction to a pipeline as soon as the pipeline is ready to accept a new instruction, but it does not send another instruction until the current instruction has been accepted by the other pipeline (CPU or FPU). The predecoder stage logic illustrated in FIG. 5 ensures that the decoder stage 168 of CPU pipeline 160 and the decoder stage 170 of FPU pipeline 162 can be at most one instruction out of synchronization during any clock cycle. To insure that the new instruction is not sent until the current instruction has been accepted or taken by both pipelines, predecode logic 200 performs the following functions:

$$select\_PDbuf = \sim(IFU\_taken\ \&\ FPU\_taken)$$

$$IFU\_taken = \sim ifu\_dec\_stall\_q | IFU\_taken\_earlier\_q$$

$$FPU\_taken = \sim fpu\_dec\_stall\_q | FPU\_taken\_earlier\_q$$

$$IFU\_taken\_earlier\_d = IFU\_taken\ \&\ \sim new\_PD\_inst\_valid$$

$$FPU\_taken\_earlier\_d = FPU\_taken\ \&\ \sim new\_PD\_inst\_valid$$

$$new\_PD\_inst\_valid = IFU\_taken\ \&\ FPU\_taken\ \&\ a\_new\_PD\_inst\_is\_available$$

Where
ifu_dec_stall_q is the signal output by latch 202, fpu_dec_stall_q is the signal output by latch 204, IFU_/FPU_taken_earlier_q are the latched versions of the IFU_/FPU_taken_earlier_q signals.

Since both pipelines actually only generate "stall signals" (ifu_dec_stall and fpu_dec_stall), these signals are converted into "taken" signals. This conversion is accomplished by latching the stall signals in latches 202 and 204 and inverting the latch outputs to provide signals ifu_dec_stall_q and fpu_dec_stall_q before providing the signals to predecode logic 200.

As can be seen from the connections between predecode buffer 208 and multiplexer 206, the predecode stage instruction is always stored in predecode buffer 208 for an additional clock cycle. This ensures that the content of predecode buffer 208 is always available in the predecode stage until both CPU pipeline decoder 168 and FPU pipeline decoder 178 have accepted the same instruction. As a result of the logic illustrated in FIG. 5, despite stall conditions from the FPU or the IFU, decoder stages 168 and 178 will be no more than one instruction of synchronization and the same instruction will exit CPU decoder stage 168 and FPU decoder stage 178 at the same time and thus both pipelines will be synchronized at this point.

Figure 6:
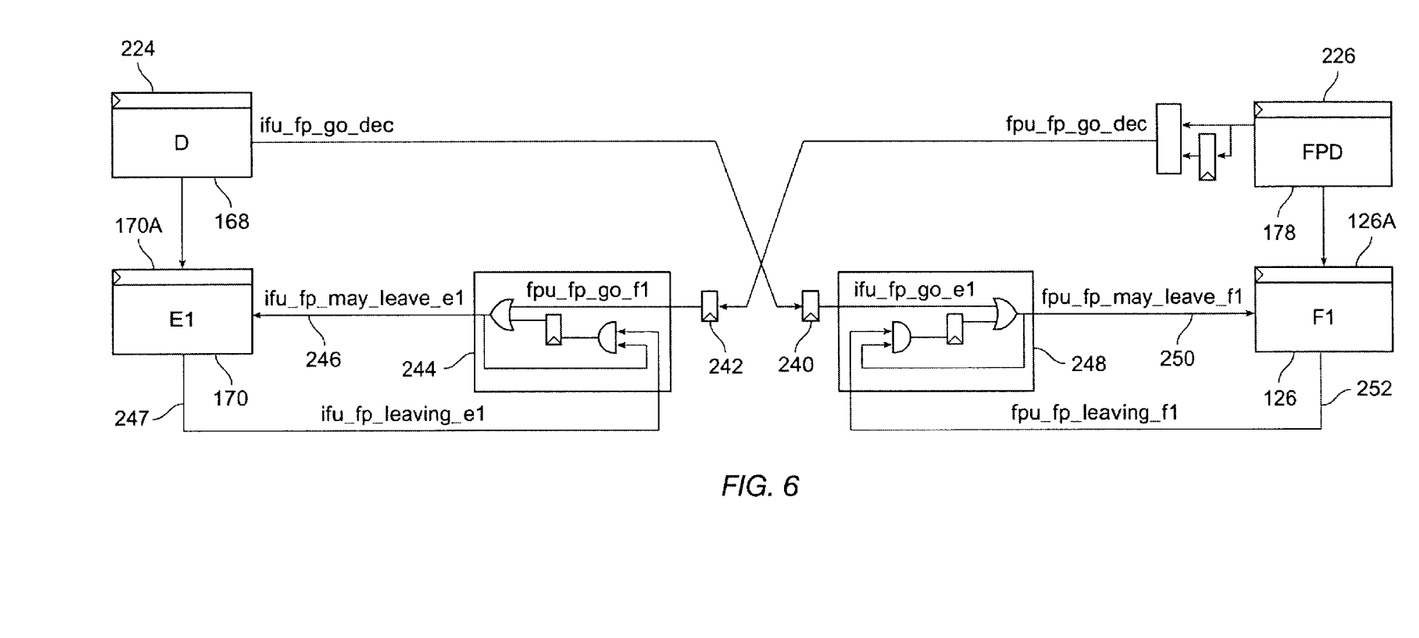
FIG. 6 is a more detailed logical block diagram of the decoder/E1–F1 stage synchronization logic of FIG. 4.

Reference is now made to FIG. 6, which figure illustrates a logical block diagram of the CPU decoder/FPU decoder-E1/F1 synchronization logic.

Once an instruction is presented to a CPU pipeline 160 and FPU pipeline 162, synchronization can immediately be lost due to different decoder stage stalling conditions in the two pipelines. To overcome this loss of synchronization, a "go-token" passing mechanism is used to resynchronize the pipelines before the two images of the same floating point instruction leave respective pipestages 170, 126. Each pipeline sends a go-token to the other pipeline when it decodes a valid floating point instruction and is not stalled due to any decoder stage stalling condition. The go-token is then latched in the other pipeline and used as a gating condition for the image of that same instruction in the other pipeline to proceed beyond pipestages 170, 126. When an image of a floating point instruction leaves pipestage 170 or 126, it clears the latch which in turn stalls pipestages 170 and 126 until a new go_token is received. A new go_token can be received as soon as the latch is cleared.

Referring specifically to FIG. 6, ifu_fp_go_dec is a go-token signal from CPU decoder pipestage 168 that indicates that the instruction in decoder pipestage 168 has been successfully decoded and that the decoder pipestage is not stalled. In the same way, the signal fpu_fp_go_dec is a token signal from floating point unit decoder pipestage 178 that indicates that the floating point instruction in decoder pipestage 178 has been successfully decoded and there are no decoder pipestage stalling conditions. Since these token signals are generated after decoding has been completed, they arrive in the other pipeline relatively late in the clock cycle. As a result, they are latched immediately in the receiving pipeline pipestage. For example, ifu_fp_go_dec is latched by latch 240 and the signal fpu_fp_go_dec is latched by latch 242. Combinatorial logic 244 responds to the signal latched in latch 244 to generate the signal ifp_fp_may_leave_e1 on line 246 that triggers execution pipestage 170 to send the instruction on to pipestage 172. As soon as the instruction leaves pipestage 172, a signal ifu_fp_leaving_e1 is generated on line. 247 which resets combinatorial logic 244 to deactivate the ifu_fp_may_leave_e1 signal so that the next instruction loaded into pipestage 170 will require another fpu_fp_go_dec token before it can exit pipestage 170.

In the same manner, the signal ifu_fp_go_f1 is output by latch 240 into combinatorial logic 248. Combinatorial logic 248 generates a signal fpu_fp_may_leave_f1 on line 250 that triggers pipestage 126 of the FPU to send the instruction on to pipestage 128. Once the instruction leaves pipestage 126, pipestage 126 generates an fpu_fp_leave_f1 signal on line 252 that causes combinatorial logic 248 to deactivate signal fpu_fp_may_leave_f1 so that the next instruction loaded into pipestage 126 will require another ifu_fp_go_dec token signal before that instruction can leave pipestage 126.

Since the same instruction had entered decoder pipestage 168 and floating point decoder pipestage 178 as a result of the synchronization mechanism illustrated in FIG. 5, the only way that the synchronization can be lost between the two pipelines between pipestages 168 and 170 in CPU pipeline 160 and pipestages 178 and 126 of FPU pipeline 162 is as a result of delays in respective decoder pipestages 168 and 178. Since the mechanism illustrated in FIG. 6 resynchronizes the CPU pipeline 160 with the FPU pipeline 162 by the time the instruction has proceeded into pipestages 170 and 126, respectively, at the time the instructions are ready to leave these pipestages, the two pipelines have been resynchronized.

The following equations describe in the operation of the illustrated synchronization logic:

ifu_fp_may_leave_e1=fpu_fp_go_dec_q|ifu_token_received_q ifu_token_received_d=ifu_fp_may_leave_e1 & ~ifu_fp_leaving_e1 ifu_fp_leaving_e1=ifu_fp_valid_e1 & ifu_fp_may_leave_e1 & ~lsu_stall_e3

The following equation describes how the go-token is generated from the CPU pipeline 160:

ifu_fp_go_dec=ifu_fp_valid_dec & ~ifu_dec_stall_cond

That is, a go-token will always be signaled to the pipeline 162 as long as no decode pipestage stalling condition is detected on a valid floating point instruction in decoder pipestage 168.

The following set of equations describes the logic necessary to generate go-tokens from FPU pipeline 162 to CPU pipeline 160.

fpu_fp_may_leave_f1=ifu_fp_go_dec_q|fpu_token_received_q fpu_token_received_d=fpu_fp_may_leave_f1 & ~fpu_fp_leaving_f1 fpu_fp_leaving_f1=fpu_fp_image_valid_f1 & fpu_fp_may_leave_f1 & ~fpu_stall_f4 fpu_fp_go_de=fpu_fp_image_valid_dec & ~fpu_go_dec_stall_cond

Once an instruction has exited CPU pipestage 170 and FPU pipestage 126, the instructions should normally execute in lockstep through the remaining pipestages of the two pipelines.

Figure 7:
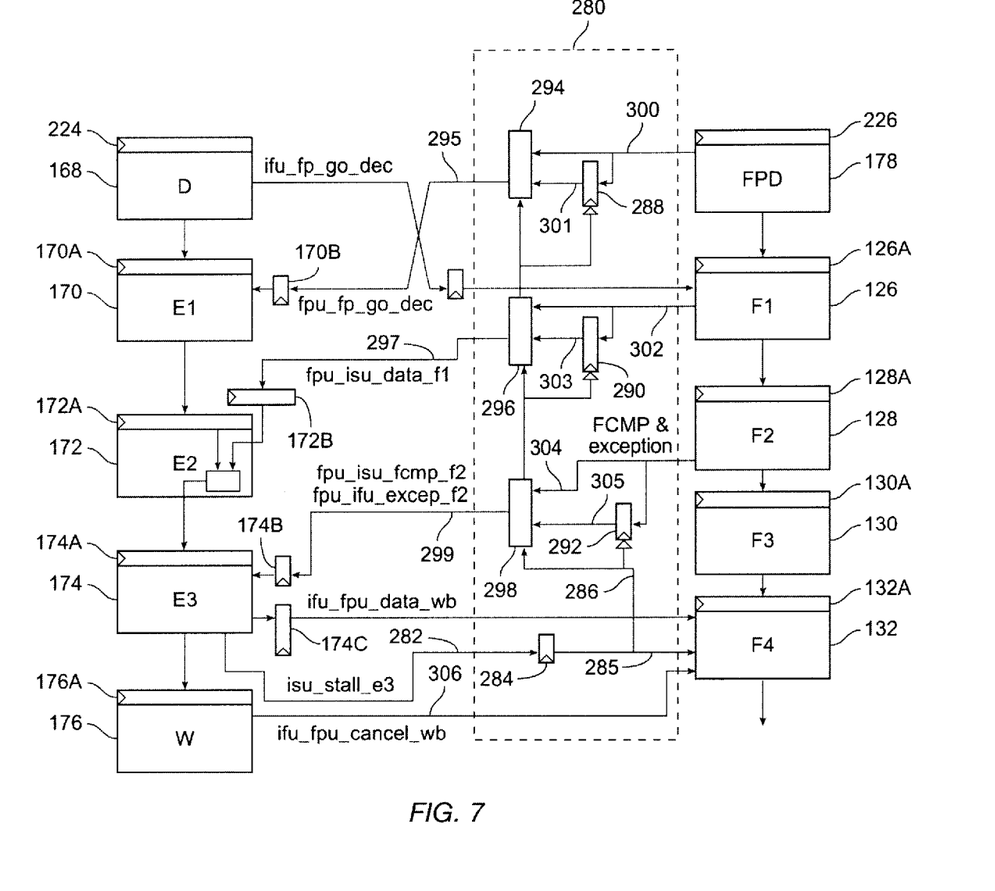
FIG. 7 is a logical block diagram of a portion of FIG. 4 illustrating the load/store unit E stage stall and resynchronization logic.

However, there is another kind of stalling condition in the CPU that can cause the CPU pipeline 160 and FPU pipeline 162 to lose synchronization with each other. This additional type of stalling condition is a load/store unit stall condition. A load/store unit stall condition occurs at pipestage 174 of CPU pipeline 160 and is caused by, for example, a load/store instruction that misses the operand cache. FIG. 7 illustrates logic circuitry that is used to stall and resynchronize the CPU pipeline 160 and FPU pipeline 162 under these conditions. In particular, logic 280 illustrated in FIG. 7 is used to resynchronize the two pipelines.

When a load/store unit stall condition occurs, the signal lsu_stall_e3 is asserted on line 282. When this signal is asserted, pipestage 174 and all prior pipestages 166, 170, and 172 of the CPU pipeline 162 are immediately stalled. The lsu_stal_e3 signal on line 282 is also sent across interface 56 to logic 280. The signal lsu_stall_e3 is latched into latch 284 during the clock cycle in which the signal stalls the CPU pipeline 160. However, during the clock cycle in which lsu_stall_e3 is asserted, the FPU pipeline 162 continues execution. On the next clock cycle, the latched stall signal is sent to pipestage 132 of FPU pipeline 162 which immediately stalls FPU pipestage 178, 126, 128, 130, and 132. During the same clock cycle, the stalling signal on line 286 from latch 284 is used to disable latching of latches 288, 290, and 292 and to control multiplexers 294, 296, and 298 to select the latched data on lines 301, 303, and 305, respectively so as to maintain the status of the go-token from decoder pipestage FCMP (an FPU instruction that compares two floating point registers) and exception information from execution pipestage 128. Latching of data from the FPU execution units that communicate with execution pipestages in CPU pipeline 160 assures that this data is not lost when FPU pipeline 162 is stalled. This ensures that the data being sent to CPU pipeline 160 on lines 295, 297, and 299 is the data from the FPU pipestages that was produced during the clock cycle in which the FPU pipeline execution advanced with respect to the CPU pipeline execution. As a result of the logic illustrated in FIG. 7, when the CPU stalls due to the load/store unit stall condition, the floating point unit advances by one pipestage with respect to the CPU pipeline, but the FPU pipeline is stalled at the next clock cycle and all data that would normally have been transmitted to the CPU pipeline is instead stored.

When the lsu_stall_e3 signal on line 282 is deactivated, CPU pipeline 160 immediately begins execution and advances by one pipestage with respect to the now-stalled FPU pipeline 162. During this clock cycle, the CPU pipestages read the data on lines 295, 297, and 299 from latches 288, 290 and 292, respectively which had been stored when the FPU was stalled. As a result of latch 284, on the next clock cycle, the stall signal on lines 285 and 286 is deactivated. This causes FPU pipeline 162 to restart immediately. However, since CPU pipeline 160 restarted one clock cycle before FPU pipeline 162 was restarted, when the stall signal on lines 286 and 285 is deactivated, the two pipelines will be resynchroriized to the same relationship they had before the load/store unit stall condition occurred and no data loss occurs. When the signal on line 286 is deactivated, multiplexer 294 selects the go-token signal on line 300, multiplexer 296 selects the da ta signal on line 302 and multiplexer 298 selects the exception signal on line 304 so that CPU pipeline 160 again receives the current signals from FPU pipeline 162. The operation of the two pipelines has thus been resynchronized and execution of floating point instructions continues.

A final synchronization point between CPU pipeline 160 and FPU pipeline 162 occurs when an instruction enters the writeback pipestage 176 of CPU pipeline 160 and when an instruction enters pipestage 132 of FPU pipeline 162. To maintain the precise exception model, cancel instructions from the CPU to the FPU, for example, in the case of pure CPU instructions, are sent as an ifu_fpucancel_wb signal on line 306. If the instruction has not been canceled by the CPU at pipestage 176, floating point pipeline 160 continues execution. When FPU pipeline 162 receives a cancel instruction, FPU 54 cancels all instructions executing in FPU pipestages 178, 126, 128, 130, and 132.

As a result of the invention, the FPU 54, while being only an option in CPU core 51, is able to be interfaced to CPU 52 so that the CPU and FPU are closely coupled to maintain high performance throughput. In addition, the close coupling of the CPU pipeline and FPU pipeline, since they are constrained to slip with respect to each other by a predetermined number of cycles, maintains a precise exception model in microcomputer 50.

As noted previously, the present invention may be implemented in a single integrated circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. In a computer system having a central processing unit (CPU) execution pipeline and a floating point unit (FPU) execution pipeline, the CPU pipeline comprising a plurality of pipestages and the FPU pipeline comprising a plurality of pipestages, wherein each CPU pipestage in the CPU pipeline has a corresponding pipestage in the FPU pipeline, a method of synchronizing operation of the CPU pipeline and the FPU pipeline, the method comprising the steps of:

a) receiving an instruction in a first CPU pipestage;
   b) receiving the instruction in a corresponding first FPU pipestage;
   c) processing the instruction in the first CPU pipestage;
   d) processing the instruction in the first FPU pipestage;
   e) generating, by the first CPU pipestage, a first signal indicating that the instruction has been processed by first CPU pipestage and is ready to proceed to a second pipestage in the CPU pipeline;
   f) generating by the first FPU pipestage, a second signal indicating that the instruction has been processed by the first FPU pipestage and is ready to proceed to a second pipestage in the FPU pipeline;
   g) sending the instruction from the first CPU pipestage to the second pipestage in the CPU pipeline;
   h) sending the instruction from the first FPU pipestage to the second pipestage in the FPU pipeline;
   i) wherein the second pipestage in the CPU pipeline responds to the second signal to send the instruction to a third pipestage in the CPU pipeline, and
   j) wherein the second pipestage in the FPU pipeline responds to the first signal to send the instruction to a third pipestage in the FPU pipeline.

2. The method of claim 1, wherein the second pipestage in the CPU pipeline further responds to the second signal to prevent the second pipestage in the CPU pipeline from sending instructions to the third pipestage in the CPU pipeline until another second signal is received from the first FPU pipestage.

3. The method of claim 1, wherein the second pipestage in the FPU pipeline further responds to the first signal to prevent the second pipestage in the FPU pipeline from sending instructions to the third pipestage in the FPU pipeline until another first signal is received from the first CPU pipestage.

4. A computer system comprising:

a central processing unit (CPU) execution pipeline including a plurality of pipestages;
   a floating point unit (FPU) execution pipeline including a plurality of pipestages;
   wherein each CPU pipestage in the CPU pipeline has a corresponding pipestage in the FPU pipeline;
   first means for controlling transmission of instructions from a first CPU pipestage to a second CPU pipestage in response to a control signal provided by an FPU pipestage; and
   second means for controlling transmission of instructions from a first FPU pipestage to a second FPU pipestage in response to a control signal provided by a CPU pipestage.

5. The computer system of claim 4, wherein the first means for controlling is a token signal having a first state that enables transmission of instructions and a second state that disables transmission of instructions.

6. The computer system of claim 5, wherein the first CPU pipestage responds to the first state of the token signal to transmit an instruction.

7. The computer system of claim 6, wherein the first CPU pipestage generates a signal that cancels the token signal when an instruction is transmitted.

8. The computer system of claim 5, wherein the first FPU pipestage responds to the first state of the token signal to transmit an instruction.

9. The computer system of claim 8, wherein the first FPU pipestage generates a signal that cancels the token signal when an instruction is transmitted.

* * * * *